United States Patent
Misske et al.

(10) Patent No.: US 8,318,653 B2
(45) Date of Patent: *Nov. 27, 2012

(54) AMPHIPHILIC WATER-SOLUBLE ALKOXYLATED POLYALKYLENEIMINES HAVING AN INNER POLYETHYLENE OXIDE BLOCK AND AN OUTER POLYPROPYLENE OXIDE BLOCK

(75) Inventors: Andrea Misske, Speyer (DE); Sophia Ebert, Mannheim (DE); Stefan Frenzel, Mannheim (DE); Dieter Boeckh, Limburgerhof (DE); Frank Huelskoetter, Bad Duerkheim (DE); James Danziger, Mason, OH (US)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/739,747

(22) PCT Filed: Nov. 7, 2008

(86) PCT No.: PCT/EP2008/065112
§ 371 (c)(1),
(2), (4) Date: Apr. 26, 2010

(87) PCT Pub. No.: WO2009/060059
PCT Pub. Date: May 14, 2009

(65) Prior Publication Data
US 2010/0261634 A1    Oct. 14, 2010

(30) Foreign Application Priority Data
Nov. 9, 2007  (EP) .................................. 07120395

(51) Int. Cl.
*C11D 3/37* (2006.01)
*C11D 1/722* (2006.01)
*C11D 3/30* (2006.01)
*C08G 73/02* (2006.01)

(52) U.S. Cl. ......... 510/360; 510/421; 510/475; 510/499

(58) Field of Classification Search .................. 510/360, 510/421, 475, 499
See application file for complete search history.

(56) References Cited

U.S. PATENT DOCUMENTS

| | | | |
|---|---|---|---|
| 3,907,701 A | 9/1975 | Liebold et al. | |
| 4,076,497 A | 2/1978 | Freyberg et al. | |
| 5,034,508 A | 7/1991 | Nishizaki et al. | |
| 5,565,145 A | 10/1996 | Watson et al. | |
| 6,075,000 A * | 6/2000 | Rohrbaugh et al. | 510/299 |
| 6,127,331 A * | 10/2000 | Cleary et al. | 510/528 |
| 2006/0234895 A1 | 10/2006 | Souter et al. | |
| 2008/0153983 A1 | 6/2008 | Boeckh et al. | |
| 2009/0176935 A1 | 7/2009 | Boeckh et al. | |
| 2009/0189086 A1 | 7/2009 | Gessner et al. | |
| 2009/0215662 A1 | 8/2009 | Boeckh et al. | |
| 2010/0011656 A1 | 1/2010 | Gessner et al. | |

FOREIGN PATENT DOCUMENTS

| | | |
|---|---|---|
| DE | 2 227 546 | 1/1974 |
| EP | 0 359 034 | 3/1990 |
| JP | 2003 20585 | 1/2003 |
| WO | 99 67352 | 12/1999 |
| WO | 2006 108856 | 10/2006 |
| WO | 2006 108857 | 10/2006 |

OTHER PUBLICATIONS

U.S. Appl. No. 12/740,050, filed Apr. 27, 2010, Misske, et al.

* cited by examiner

*Primary Examiner* — Brian P Mruk
(74) *Attorney, Agent, or Firm* — Oblon, Spivak, McClelland, Maier & Neustadt, L.L.P.

(57) ABSTRACT

The present invention relates to amphiphilic water-soluble alkoxylated polyalkyleneimines having an inner polyethylene oxide block comprising 20 to 50 polyethylene oxide units and an outer polypropylene oxide block comprising 10 to 50 polyethylene oxide units and especially to such alkoxylated polyalkyleneimines wherein the ratio of polyethylene oxide units and polypropylene oxide units is proportionally related to the square root of the number of polyalkyleneimine units present in the backbone. The present invention further relates to the use of these alkoxylated polyalkyleneimines as a soil detachment promoting additive to laundry detergents and cleaning compositions and to laundry detergents and cleaning compositions which comprise these alkoxylated mono- or polyalkyleneimines.

20 Claims, No Drawings

AMPHIPHILIC WATER-SOLUBLE ALKOXYLATED POLYALKYLENEIMINES HAVING AN INNER POLYETHYLENE OXIDE BLOCK AND AN OUTER POLYPROPYLENE OXIDE BLOCK

CROSS REFERENCE TO RELATED APPLICATION

This application is a 371 of PCT/EP08/065112, filed on Nov. 7, 2008, and claims priority to European Patent Application No. 07120395.4, filed on Nov. 9, 2007.

This invention was made under a joint research agreement between BASF SE of Ludwigshafen, Germany and The Procter & Gamble Company of Cincinnati, OH.

The present invention relates to amphiphilic water-soluble alkoxylated polyalkyleneimines having an inner polyethylene oxide block comprising 20 to 50 polyethylene oxide units and an outer polypropylene oxide block comprising 10 to 50 polyethylene oxide units and especially to such alkoxylated polyalkyleneimines wherein the ratio of polyethylene oxide units and polypropylene oxide units is proportionally related to the square root of the number of polyalkyleneimine units present in the backbone.

The invention further relates to the use of these alkoxylated mono- or polyalkyleneimines as a soil detachment promoting additive to laundry detergents and cleaning compositions and to laundry detergents and cleaning compositions which comprise these alkoxylated mono- or polyalkyleneimines.

In addition to surfactants, polymers are also used as soil detachment-promoting additives for laundry detergents and cleaning compositions. The known polymers are very suitable, for example, as dispersants of soil pigments such as clay minerals or soot, and as additives which prevent the reattachment of already detached soil. Such dispersants are, though, especially at low temperatures, substantially ineffective in the removal of greasy soil from the surfaces.

WO-A-99/67352 describes dispersants for hydrophobic soil which are compatible with peroxidic bleaches, are said to prevent the resettling of the greasy soil detached in the course of washing onto the cleaned textile and are based on alkoxylated polyethyleneimines which have an inner polypropylene oxide block and an outer, distinctly larger polyethylene oxide block.

U.S. Pat. No. 5,565,145 recommends, as dispersants for nonpolar particulate soil, uncharged alkoxylated polyethyleneimines which may contain up to 4 propylene oxide units per active NH group bonded directly to the nitrogen atom. However, preferred and demonstrated by way of example are polyethyleneimines which are exclusively ethoxylated or at most incipiently propoxylated, i.e. not more than 1 mol of propylene oxide per NH group.

These alkoxylated polyethyleneimines too are good dispersants for hydrophilic soil pigments, but do not show a satisfactory wash result in the case of greasy stains. Polyethyleneimines which have an inner polyethylene oxide block and an outer polypropylene oxide block are yet to be used in laundry detergents or cleaning compositions.

U.S. Pat. No. 4,076,497 discloses the use of initially ethoxylated and then propoxylated polyethyleneimines which have been reacted in total with 30 mol of alkylene oxide, including at least 15 mol of propylene oxide, per mole of active NH group as assistants for the dyeing of polyester and cellulose fibers with dispersion dyes. However, the alkyleneoxy chains of the inventive polyalkyleneimines contain at most 12 propyleneoxy units.

DE-A-22 27 546 describes, as well as polyethyleneimines which have the reverse alkylene oxide sequence, also polyethyleneimines which have initially been ethoxylated and then propoxylated as breakers for crude oil emulsions. However, in comparison to the inventive polyalkyleneimines, these polyethyleneimines have too high a total degree of alkoxylation of at least 105 mol of alkylene oxide per mole of alkoxylatable NH group and too high a molar ratio of propylene oxide to ethylene oxide of from 1.9 to 4:1 (or conversely too small a molar ratio of ethylene oxide to propylene oxide of from 0.53 to 0.25).

JP-A-2003-020585 describes the use of alkoxylated polyethyleneimines in deinking processes. As well as polyethyleneimines which are preferably exclusively ethoxylated or else initially ethoxylated and then alkoxylated randomly with an ethylene oxide/propylene oxide mixture, a product is also disclosed which is based on a polyethyleneimine of average molecular weight Mw 600 and has been reacted initially with 100 mol of ethylene oxide and then with 100 mol of propylene oxide per mole of alkoxylatable NH group and thus likewise with a very much larger amount of alkylene oxide than in the case of the inventive polyethyleneimines.

EP-A-359 034 discloses assistants for the preparation and stabilization of nonaqueous pigment dispersions which are based on at least two polyethyleneimines comprising polyalkylene oxide blocks. When polyethyleneimines which have an outer block of a higher alkylene oxide are used, they are always initially ethoxylated and then butoxylated compounds, some of which contain a small intermediate polypropylene oxide block. Polyethyleneimines which have an inner polyethylene oxide block and an outer polypropylene oxide block are always additionally reacted with at least one mol per mole of active NH group of an α-olefin oxide.

WO 2006108856, WO 2006108857 and U.S. 2006234895 disclose alkoxylated polyethyleneimines providing improved hydrophobic soil removal in laundry. The alkoxylated polyethyleneimines have polyalkoxy chains of a specified total chain-length in combination with blocks of ethyleneoxide and propyleneoxide of defined arrangement and sizes. Even though these polymers are providing beneficial properties for hydrophobic soil cleaning and whiteness maintenance there is still a need for improvement.

Thus, it is an objective of the present invention to provide new polymers that have beneficial properties for the use as additives for laundry detergents, for hydrophobic and hydrophilic soil cleaning and whiteness maintenance. Those new polymers should be suitable for cleaning compositions for removing greasy soil and hydrophilic soil from textile and hard surfaces and for preventing suspended and emulsified soil from redeposition to surfaces of textiles or hard surfaces. The new polymers should display a synergy with proteases for removing protease-sensitive stains like grass. In particular, the polymers also should exhibit good greasy soil-detaching and soil-antiredeposition action even at low washing temperatures.

Accordingly, mixtures of amphiphilic water-soluble alkoxylated polyalkyleneimines comprising in condensed form repeating units of formulae (I), (II), (III) and (IV)

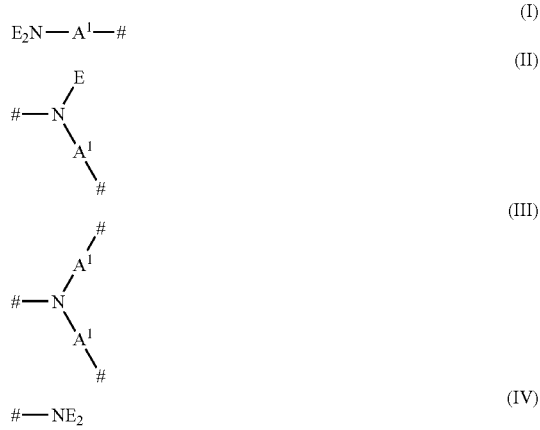

wherein
in each case denotes a bond between a nitrogen atom and the free binding position of a group $A^1$ of two adjacent repeating units of formulae (I), (II), (III) or (IV); and
wherein the variables in each case are defined as follows:
$A^1$ is independently selected from linear or branched $C_2$-$C_6$-alkylene;
E is independently selected from alkyleneoxy units of the formula (V)

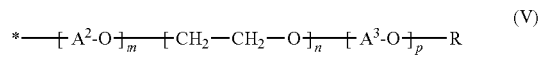

wherein
* in each case denotes the bond to the nitrogen atom of the repeating unit of formula (I), (II) or (IV);
$A^2$ is in each case independently selected from 1,2-propylene, 1,2-butylene and 1,2-isobutylene;
$A^3$ is 1,2-propylene;
R is in each case independently selected from hydrogen and $C_1$-$C_4$-alkyl;
m has an average value in the range of from 0 to 2;
n has an average value in the range of from 20 to 50; and
p is a rational number from 10 to 50;
the individual alkoxylated polyalkyleneimines consisting of 1 repeating unit of formula (I), x repeating units of formula (II), y repeating units of formula (III) and y+1 repeating units of formula (IV), wherein
x and y in each case have a value in the range of from 0 to 150; and
the average molecular weight Mw of the polyalkyleneimine backbone in each case having a value in the range of from 60 to 10 000 g/mol;
and mixtures of quaternization products thereof have been found.

The alkoxylated polyalkyleneimines according to the present invention are generally obtained as a mixture of different individual alkoxylated polyalkyleneimines. Therefore, unless otherwise indicated the values, ranges and ratios given in the specification for m, n, p, x, y and the molecular weight (Mw) relate to the number average values of the individual alkoxylated polyalkyleneimines present in the mixture obtained.

Due to their amphiphilicity the alkoxylated polyalkyleneimines according to the invention have a balanced ratio of hydrophobic and hydrophilic structural elements and are on the one hand hydrophobic enough to absorb an greasy soil and to remove them together with the surfactants and the remaining washing components of the laundry detergents and cleaning compositions, and on the other hand hydrophilic enough to keep the detached greasy soil in the washing and cleaning liquor and prevent it from resettling an the surface.

An essential feature of the alkoxylated polyalkyleneimines according to the present invention compared to previously described alkoxylated polyalkyleneimines is their extended side-chains, i.e. they have significantly longer amphiphilic polyalkoxy-chains and generally larger individual block-sizes of the hydrophilic polyethylene oxide-blocks and the hydrophobic polypropylene oxide-blocks. These longer side-chains support a better stabilization of soils in the washing- or cleaning-liquor. Thus, the re-deposition of the soils to the cleaned goods is prevented. Another important advantage of the alkoxylated polyalkyleneimines according to the invention is their enhanced color- and odor-profile. While alkoxylated polyalkyleneimines with shorter side-chains are generally dark in color and have a characteristic odor it has been found, that the alkoxylated polyalkyleneimines according to the invention have much lower levels of both.

These effects are achieved by the alkoxylated polyalkyleneimines according to the present invention having an inner polyethylene oxide block and an outer polypropylene oxide block, the degree of ethoxylation and the degree of propoxylation not going above or below specific limiting values. Alkoxylated polyalkyleneimines according to the present invention having a minimum value for the ratio of polyethylene blocks to polypropylene blocks (n/p) of 0.6 and preferably 0.8 and a maximum value for this ratio (n/p) related to the polyalkylene backbone according to an empirically found relationship of $1.5(x+2y+1)^{1/2}$ and preferably $1.2(x+2y+1)^{1/2}$ have been found to have especially beneficial properties.

The alkoxylated polyalkyleneimines according to the present invention have a backbone which consists of primary, secondary and tertiary amine nitrogen atoms which are attached to one another by alkylene radicals A and are randomly arranged.

Primary amino moieties which start or terminate the main chain and the side chains of the polyalkyleneimine backbone and whose remaining hydrogen atoms are subsequently replaced by alkyleneoxy units are referred to as repeating units of formulae (I) or (IV), respectively.

Secondary amino moieties whose remaining hydrogen atom is subsequently replaced by alkyleneoxy units are referred to as repeating units of formula (II).

Tertiary amino moieties which branch the main chain and the side chains are referred to as repeating units of formula (III).

Since cyclization can occur in the formation of the polyalkyleneimine backbone, it is also possible for cyclic amino moieties to be present to a small extent in the backbone. Such polyalkyleneimines containing cyclic amino moieties are of course alkoxylated in the same way as those consisting of the noncyclic primary and secondary amino moieties.

The polyalkyleneimine backbone consisting of the nitrogen atoms and the groups $A^1$ has an average molecular weight Mw of from 60 to 10 000 g/mole, preferably from 100 to 8 000 g/mole and more preferably from 500 to 6 000 g/mole.

The sum (x+2y+1) corresponds to the total number of alkyleneimine units present in one individual polyalkyleneimine backbone and thus is directly related to the molecular weight of the polyalkyleneimine backbone. The values given in the specification however relate to the number average of all polyalkyleneimines present in the mixture.

The sum (x+2y+2) corresponds to the total number amino groups present in one individual polyalkyleneimine backbone.

The radicals $A^1$ connecting the amino nitrogen atoms may be identical or different, linear or branched $C_2$-$C_6$-alkylene radicals, such as 1,2-ethylene, 1,2-propylene, 1,2-butylene, 1,2-isobutylene,1,2-pentanediyl, 1,2-hexanediyl or hexamethylene. A preferred branched alkylene is 1,2-propylene. Preferred linear alkylene are ethylene and hexamethylene. A more preferred alkylene is 1,2-ethylene.

The hydrogen atoms of the primary and secondary amino groups of the polyalkyleneimine backbone are replaced by alkyleneoxy units of the formula (V).

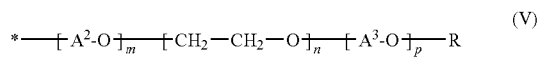

In this formula, the variables preferably have one of the meanings given below:
$A^2$ in each case is selected from 1,2-propylene, 1,2-butylene and 1,2-isobutylene; preferably $A^2$ is 1,2-propylene;
$A^3$ is 1,2-propylene;
R in each case is selected from hydrogen and $C_1$-$C_4$-alkyl, such as methyl, ethyl, n-propyl, isopropyl, n-butyl, isobutyl and tert.-butyl; preferably R is hydrogen;
The index m in each case has a value of 0 to 2; preferably m is 0 or approximately 1; more preferably m is 0;
The index n has an average value in the range of from n is a rational number from 20 to 50, preferably in the range of from 22 to 40 and more preferably in the range of from 24 to 30;
The index p has an average value in the range of from n is a rational number from 10 to 50, preferably in the range of from 11 to 40 and more preferably in the range of from 12 to 30.

The alkyleneoxy units of formula (V) can be conceived as a non-random sequence of alkoxylate blocks, i.e. -$[A^2$-$O]_m$- is added closest to the nitrogen atom of the repeating units of formulae (I), (II) or (III), the —$[CH_2CH_2O]_n$— is added second and the -$[A^3$-$O]_p$- is added third. This orientation provides the alkoxylated polyalkyleneimine with an inner polyethylene oxide block, and an outer polypropylene oxide block.

The substantial part of these alkyleneoxy units of formula (V) is formed by the ethyleneoxy units —$[CH_2$—$CH_2$—$O)]_n$— and the propyleneoxy units -$[A^3$-$O]_p$-.

The alkyleneoxy units may additionally also have a small proportion of propyleneoxy or butyleneoxy units -$[A^2$-$O]_m$-, i.e. the polyalkyleneimine backbone saturated with hydrogen atoms may be reacted initially with small amounts of up to 2 mol, especially from 0.5 to 1.5 mol, in particular from 0.8 to 1.2 mol, of propylene oxide or butylene oxide per mole of NH-moieties present, i.e. incipiently alkoxylated.

This initial modification of the polyalkyleneimine backbone allows, if necessary, the viscosity of the reaction mixture in the alkoxylation to be lowered. However, the modification generally does not influence the performance properties of the alkoxylated polyalkyleneimine and therefore does not constitute a preferred measure.

The alkoxylated polyalkyleneimines according to the present invention may also be quaternized. A suitable degree of quaternization is up to 50%, in particular from 5 to 40%. The quaternization is effected preferably by introducing $C_1$-$C_4$-alkyl groups and may be undertaken in a customary manner by reaction with corresponding alkyl halides and dialkyl sulfates.

The quaternization may be advantageous in order to adjust the alkoxylated polyalkyleneimines to the particular composition of the laundry detergent and cleaning composition in which they are to be used, and to achieve better compatibility and/or phase stability of the formulation. The alkoxylated polyalkyleneimines are preferably not quaternized.

The inventive alkoxylated polyalkyleneimines may be prepared in a known manner.

One preferred procedure consists in initially undertaking only an incipient alkoxylation of the polyalkyleneimine in a first step.

In this step, the polyalkyleneimine is reacted only with a portion of the total amount of ethylene oxide used, which corresponds to about 1 mol of ethylene oxide per mole of NH moiety or, when the polyalkyleneimine is to be modified initially with up to 2 mol of propylene oxide or butylene oxide per mole of NH moiety, here too initially only with up to 1 mol of this alkylene oxide.

This reaction is undertaken generally in the absence of a catalyst in an aqueous solution at a reaction temperature from 70 to 200° C. and preferably from 80 to 160° C.

This reaction may be affected at a pressure of up to 10 bar and in particular up to 8 bar.

In a second step, the further alkoxylation is then effected by subsequent reaction i) with the remaining amount of ethylene oxide or, in the case of a modification by higher alkylene oxide in the first step, with the entirety of ethylene oxide and ii) with propylene oxide.

The further alkoxylation is undertaken typically in the presence of a basic catalyst. Examples of suitable catalysts are alkali metal and alkaline earth metal hydroxides such as sodium hydroxide, potassium hydroxide and calcium hydroxide, alkali metal alkoxides, in particular sodium and potassium $C_1$-$C_4$-alkoxides, such as sodium methoxide, sodium ethoxide and potassium tert-butoxide, alkali metal and alkaline earth metal hydrides such as sodium hydride and calcium hydride, and alkali metal carbonates such as sodium carbonate and potassium carbonate. Preference is given to the alkali metal hydroxides and the alkali metal alkoxides, particular preference being given to potassium hydroxide and sodium hydroxide. Typical use amounts for the base are from 0.05 to 10% by weight, in particular from 0.5 to 2% by weight, based on the total amount of polyalkyleneimine and alkylene oxide.

The further alkoxylation may be undertaken in substance (variant a)) or in an organic solvent (variant b)). The process conditions specified below may be used both for the ethoxylation and for the subsequent propoxylation.

In variant a), the aqueous solution of the incipiently alkoxylated polyalkyleneimine obtained in the first step, after addition of the catalyst, is initially dewatered. This can be done in a simple manner by heating to from 80 to 150° C. and distilling off the water under a reduced pressure of from 0.01 to 0.5 bar.

The subsequent reaction with the alkylene oxide is effected typically at a reaction temperature from 70 to 200° C. and preferably from 100 to 180° C.

The subsequent reaction with the alkylene oxide is effected typically at a pressure of up to 10 bar and in particular up to 8 bar.

The reaction time of the subsequent reaction with the alkylene oxide is generally about 0.5 to 4 h.

Suitable organic solvents for variant b) are in particular nonpolar and polar aprotic organic solvents. Examples of particularly suitable nonpolar aprotic solvents include aliphatic and aromatic hydrocarbons such as hexane, cyclohexane, toluene and xylene. Examples of particularly suitable polar aprotic solvents are ethers, in particular cyclic ethers such as tetrahydrofuran and dioxane, N,N-dialkylamides such as dimethylformamide and dimethylacetamide, and N-alkyllactams such as N methylpyrrolidone. It is of course also possible to use mixtures of these organic solvents. Preferred organic solvents are xylene and toluene.

In variant b), the solution obtained in the first step, after addition of catalyst and solvent, is initially dewatered, which is advantageously done by separating out the water at a temperature of from 120 to 180° C., preferably supported by a gentle nitrogen stream. The subsequent reaction with the alkylene oxide may be effected as in variant a).

In variant a), the alkoxylated polyalkyleneimine is obtained directly in substance and may be converted if desired to an aqueous solution. In variant b), the organic solvent is typically removed and replaced by water. The products may of course also be isolated in substance.

The alkoxylated polyalkyleneimines according to the present invention, as a 1% by weight solution in distilled water, have a cloud point of generally ≦70° C., preferably ≦65° C. The cloud point is more preferably in the range from 25 to 55° C.

The alkoxylated polyalkyleneimines according to the present invention are outstandingly suitable as a soil detachment-promoting additive for laundry detergents and cleaning compositions. They exhibit high dissolving power especially in the case of greasy soil. It is of particular advantage that they display the soil-detaching power even at low washing temperatures.

The alkoxylated polyalkyleneimines according to the present invention can be added to the laundry detergents and cleaning compositions in amounts of generally from 0.05 to 10% by weight, preferably from 0.1 to 5% by weight and more preferably from 0.25 to 2.5% by weight, based on the particular overall composition.

In addition, the laundry detergents and cleaning compositions generally comprise surfactants and, if appropriate, further polymers as washing substances, builders and further customary ingredients, for example cobuilders, complexing agents, bleaches, standardizers, graying inhibitors, dye transfer inhibitors, enzymes and perfumes.

EXAMPLES

I. Preparation of Inventive Alkoxylated Polyalkyleneimines

Example 1

PE 1600+24EO/NH+16PO/NH a) PEI 600+1EO/NH

In a 3.5 L autoclave of a polyethyleneimine (1184.0 g, approx. average Mw=600 g/mol) and water (205.0 g) were heated to 80° C. The autoclave was purged three times with nitrogen up to a pressure of 5 bar. After increasing the temperature to 120° C. ethylene oxide (908.7 g) was added in portions. The pressure was raised to 7 bar. To complete the reaction, the mixture was allowed to post-react for 2 h at 120° C. The reaction mixture was stripped with nitrogen and volatile compounds were removed in vacuo at 70° C. This procedure yielded 2305 g of an 91% by weight aqueous solution of polyethyleneimine alkoxylated by 1 mole of ethylene oxide per mole of NH-bond as a yellow viscous liquid. Amine titer: 11.22 mmol/g; pH (of 1% by weight aq. solution): 11.06.

b) PEI 600+24EO/NH

In a 2 L autoclave the aqueous solution obtained in example 1.a) (108.6 g) and an aqueous solution of potassium hydroxide (50% by weight, 2.9 g) were heated to 80° C. The autoclave was purged three times with nitrogen up to a pressure of 5 bar. Water was removed from the reaction mixture at 120° C. and at a pressure of 10 mbar for 2 h. After flushing the autoclave with nitrogen, the temperature was increased to 145° C. and ethylene oxide (1329.9 g) was added in portions. The pressure was raised up to 5 bar. To complete the reaction, the mixture was allowed to post-react for 3 h at 120° C. The reaction mixture was stripped with nitrogen and volatile compounds were removed in vacuo at 70° C. This procedure yielded 1428 g of polyethyleneimine alkoxylated by 24 mole of ethylene oxide per mole of NH-bond as a yellow-brown viscous liquid. Amine titer: 0.82 mmol/g; pH (of 1% by weight aq. solution): 10.6.

c) PEI 600+24EO/NH+16PO/NH

In a 2 L autoclave 460.9 g of the alkoxylated polyethyleneimine obtained in example 1.b) was heated to 80° C. and purged three times with nitrogen up to a pressure of 5 bar. After increasing the temperature to 140° C., propylene oxide (389.1 g) was added in portions. The pressure was raised up to 5 bar. To complete the reaction, the mixture was allowed to post-react for 5 h at 140° C. The reaction mixture was stripped with nitrogen and volatile compounds were removed in vacuo at 70° C. This procedure yielded 838 g of a polyethyleneimine which contained 24 mole of ethylene oxide and 16 mole propylene oxide per mole of NH bond as a yellow viscous liquid. Amine titer: 0.59 mmol/g; pH of a 1% by weight aq. solution: 9.7; Iodine color number of pure compound: 7.9.

Example 2

PEI 600+24EO/NH+24PO/NH a) PEI 600+24EO/NH+24PO/NH

In a 2 L autoclave the alkoxylated polyethyleneimine obtained in example 1.b) (341.3 g) was heated to 80° C. The autoclave was purged three times with nitrogen up to a pressure of 5 bar. After increasing the temperature to 140° C. propylene oxide (425.5 g) was added in portions. The pressure was raised up to 6 bar. To complete the reaction, the mixture was allowed to post-react for 5 h at 140° C. The reaction mixture was stripped with nitrogen and volatile compounds were removed in vacuo at 80° C. This procedure yielded 780 g of a polyethyleneimine alkoxylated with 24 mole of ethylene oxide and 24 mole propylene oxide per mole of NH-bonds as a yellow viscous liquid. Amine titer: 0.36 mmol/g; pH (1% by weight aq. solution): 9.1; Iodine color number (pure compound, 40° C.): 7.3.

Example 3

DETA+24EO/NH+24PO/NH a) DETA+1 EO/NH

In a 2 L autoclave diethylene triamine (381.8 g) and water (19.1 g) were heated to 70° C. The autoclave was purged three times with nitrogen up to a pressure of 5 bar. After the temperature had been increased to 90° C. ethylene oxide (814 g) was added in portions. The pressure was raised up to 3 bar. To complete the reaction, the mixture was allowed to post-react for 2 h at 90° C. The reaction mixture was stripped with nitrogen and volatile compounds were removed in vacuo at 70° C. This procedure yielded 1180 g of diethylene triamine alkoxylated with 1 mole of ethylene oxide per mole of NH-bonds as a yellow viscous liquid.

b) DETA+24EO/NH

In a 2 L autoclave diethylene triamine alkoxylated with 1 mole of ethylene oxide per mole NH bond obtained in example 3.a) (79.7 g) and an aqueous solution of potassium hydroxide (50% by weight, 2.9 g) were heated to 80° C. The autoclave was purged three times with nitrogen up to a pressure of 5 bar. Water was removed from the reaction mixture at 100° C. and a pressure of 10 mbar for 2 h. After the flushing the autoclave with nitrogen, the temperature was increased to 120° C. and ethylene oxide (1266.1 g) was added in portions. The pressure was raised up to 5 bar. To complete the reaction, the mixture was allowed to post-react for 3 h at 120° C. The reaction mixture was stripped with nitrogen and volatile compounds were removed in vacuo at 80° C. This procedure yielded 1366 g of diethylene triamine alkoxylated with 24 mole of ethylene oxide per mole of NH-bond as a brown solid. Amine titer: 0.58 mmol/g; pH (1% by weight aq. solution): 10.4.

c) DETA+24EO/NH+24PO/NH

In a 2 L autoclave diethylene triamine alkoxylated with 24 mole of ethylene oxide per mole NH-bond obtained in example 3.b) (310.6 g) was heated to 80° C. The autoclave was purged three times with nitrogen up to a pressure of 5 bar. After flushing the autoclave with nitrogen, the temperature was increased to 140° C. and propylene oxide (396.7 g) was added in portions. The pressure was raised up to 4 bar. To complete the reaction, the mixture was allowed to post-react for 5 h at 140° C. The reaction mixture was stripped with nitrogen and volatile compounds were removed in vacuo at 80° C. This procedure yielded 705 g of diethylene triamine alkoxylated with 24 mole of ethylene oxide and 24 mole propylene oxide per mole of NH-bonds as a light brown solid. Amine titer: 0.26 mmol/g, pH (1% by weight aq. solution): 10.0; Iodine colour number (pure compound, 40° C.): 2.9.

Example 4

Hexamethylene diamine+24EO/NH+16PO/NH a) Hexamethylene diamine+1 EO/NH

In a 2 L autoclave hexamethylene diamine (527 g) and water (26.5 g) were heated to 70° C. The autoclave was purged three times with nitrogen up to a pressure of 5 bar. After increasing the temperature to 90° C. ethylene oxide (800 g) was added in portions. The pressure was raised up to 6 bar. To complete the reaction, the mixture was allowed to post-react for 3 h at 90° C. The reaction mixture was stripped with nitrogen and volatile compounds were removed in vacuo at 70° C. This procedure yielded 1356 g of hexamethylene diamine alkoxylated with 1 mole of ethylene oxide per mole of NH-bonds as a light yellow solid. Amine titer: 6.70 mmol/g.

b) Hexamethylene diamine+24EO/NH+16PO/NH

In a 2 L autoclave the hexamethylene diamine alkoxylated with 1 mole of ethylene oxide per mole NH-bonds obtained in example 4.a) (45,0 g) and an aqueous solution of potassium hydroxide (50% by weight, 1.4 g) were heated to 80° C. The autoclave was purged three times with nitrogen up to a pressure of 5 bar. Water was removed from the mixture at 100° C. and at a pressure of 10 mbar for 2 h. After flushing the autoclave with nitrogen, the temperature was increased to 120° C. and ethylene oxide (623.2 g) was added in portions. The pressure was raised up to 6 bar. To complete the reaction, the mixture was allowed to post-react for 3 h at 120° C. After the temperature had been increased to 140° C. propylene oxide (571.5 g) was added in portions. The pressure was raised up to 6 bar. To complete the reaction, the mixture was allowed to post-react for 5 h at 140° C. The reaction mixture was stripped with nitrogen and volatile compounds were removed in vacuo at 80° C. This procedure yielded 1250 g of hexamethylene diamine alkoxylated with 24 mole of ethylene oxide and 16 mole propylene oxide per mole of NH-bonds as a yellow-light brown solid. Amine titer: 0.25 mmol/g; pH (1% by weight aq. solution): 10.3; Iodine colour number (pure compound, 40° C.): 1.3.

What is claimed is:

1. A mixture comprising amphiphilic alkoxylated polyalkyleneimines comprising a polyalkyleneimine backbone comprising in condensed form repeating units represented by formulae (I), (II), (III) and (IV)

wherein
in each case denotes a bond between a nitrogen atom and the free binding position of a group $A^1$ of two adjacent repeating units represented by formulae (I), (II), (III) or (IV); and wherein the variables in each case are defined as follows:
$A^1$ is independently selected from the group consisting of linear and branched $C_2$-$C_6$-alkylene;
E is independently at least one alkyleneoxy unit represented by formula (V)

$$*-\!\!\left[A^2\text{-}O\right]_{\!m}\!\!\left[CH_2\text{---}CH_2\text{---}O\right]_{\!n}\!\!\left[A^3\text{-}O\right]_{\!p}\!\!-\!R \quad (V)$$

wherein
* in each case denotes the bond to the nitrogen atom of the repeating units of formula (I), (II) or (IV);
$A^2$ is in each case independently selected from the group consisting of 1,2-propylene, 1,2 butylene and 1,2 isobutylene;
$A^3$ is 1,2-propylene;
R is in each case independently selected from the group consisting of hydrogen and $C_1$-$C_4$-alkyl;
m has an average value in the range of from 0 to 2;
n has an average value in the range of from 20 to 50; and
p has an average value in the range of from 10 to 50;
the amphiphilic alkoxylated polyalkyleneimines comprising 1 repeating unit of formula (I), x repeating units represented by formula (II), y repeating units represented by formula (III) and y+1 repeating units represented by formula (IV), wherein x and y in each case have a value in the range of from 0 to 150; and the average molecular weight Mw of the polyalkyleneimine backbone in each case having a value in the range of from 60 to 10 000 g/mol;

and mixtures of quaternization products thereof.

2. The mixture according to claim 1, wherein the ratio of n to p has an average value in the range of from 0.6 to $1.5(x+2y+1)^{1/2}$.

3. The mixture according to claim 1, wherein the ratio of n to p has an average value in the range of from 0.8 to $1.2(x+2y+1)^{1/2}$.

4. The mixture according to claim 1, wherein m is 0.

5. The mixture according to claim 1, wherein n has an average value in the range of from 22 to 40.

6. The mixture according to claim 1, wherein n has an average value in the range of from 24 to 30.

7. The mixture according to claim 1, wherein p has an average value in the range of from 11 to 40.

8. The mixture according to claim 7, wherein p has an average value in the range of from 12 to 30.

9. The mixture according to claim 1, wherein $A^1$ is ethylene.

10. The mixture according to claim 1, wherein R is hydrogen.

11. The mixture according to claim 1, wherein the molecular weight Mw of the polyalkyleneimine backbone has an average value in the range of from 100 to 8000 g/mol.

12. The mixture according to claim 1, wherein the molecular weight Mw of the polyalkyleneimine backbone has an average value in the range of from 500 to 6000 g/mol.

13. The mixture according to claim 1, wherein up to 50% of the nitrogen atoms present are quaternized.

14. A cleaning composition comprising the mixture according to claim 1.

15. The cleaning composition according to claim 14, wherein the mixture comprises 0.05-10% by weight of said cleaning composition.

16. The mixture according to claim 1, wherein a molar ratio of propylene oxide to ethylene oxide in the group represented by formula (V) is at most 1:1.

17. The mixture according to claim 1, wherein a molar ratio of propylene oxide to ethylene oxide in the group represented by formula (V) is from 0.67:1 to 1:1.

18. The mixture according to claim 1, wherein the amphiphilic alkoxylated polyalkyleneimine has a degree of quaternization of from 5 to 40%.

19. The cleaning composition according to claim 14, wherein the mixture comprises 0.1-5% by weight of said cleaning composition.

20. The cleaning composition according to claim 14, wherein the mixture comprises 0.25-2.5% by weight of said cleaning composition.

* * * * *